United States Patent [19]

Matsumoto et al.

[11] Patent Number: 5,001,640
[45] Date of Patent: Mar. 19, 1991

[54] SERVO CONTROL SYSTEM

[75] Inventors: Naoki Matsumoto, Kariya; Hiroaki Kuraoka, Oobu; Naoto Ohoka, Toyohashi; Masahiro Ohba, Okazaki, all of Japan

[73] Assignee: Nippondenso Co., Ltd., Kariya, Japan

[21] Appl. No.: 212,256

[22] Filed: Jun. 27, 1988

[30] Foreign Application Priority Data

Jun. 27, 1987 [JP] Japan .................. 62-160564

[51] Int. Cl.$^5$ .............................. B60T 8/58
[52] U.S. Cl. ................... 364/426.02; 364/426.01; 303/103; 303/102; 303/96
[58] Field of Search .......... 364/426.01, 424.01, 364/424.05, 426.02, 513; 303/93, 94, 95, 96, 100, 102, 103

[56] References Cited

U.S. PATENT DOCUMENTS

| | | | |
|---|---|---|---|
| 4,676,353 | 6/1987 | Matsuda | 192/13 R |
| 4,679,866 | 7/1987 | Van Zanten et al. | 364/426.02 |
| 4,760,896 | 8/1988 | Yamaguchi | 187/124 |
| 4,770,266 | 9/1988 | Yamaguchi et al. | 364/426.02 |
| 4,777,585 | 10/1988 | Kokawa et al. | 364/513 |
| 4,809,175 | 2/1989 | Hosaka et al. | 364/424 |
| 4,830,508 | 5/1989 | Higuchi et al. | 366/152 |
| 4,848,851 | 7/1989 | Kuraoka et al. | 364/426.01 |

FOREIGN PATENT DOCUMENTS

| | | |
|---|---|---|
| 0148349 | 7/1985 | European Pat. Off. |
| 0149801 | 7/1985 | European Pat. Off. |
| 0217087 | 4/1987 | European Pat. Off. |
| 0225180 | 6/1987 | European Pat. Off. |

OTHER PUBLICATIONS

N. Matsumoto et al.; IECON 87, "Expert Antiskid System"; Nov. 1987; pp. 810-816.
H. Leiber et al.; SAE Technical Paper Series 790458, "Antiskid System for Passenger Cars with a Digital Electronic Control Unit"; 1979; pp. 1-7.
M. Sugeno et al.; IEEE TA9-10:30, "Fuzzy Parking Control of Model Car", Dec. 1984; pp. 902-903.
M. Nagai et al.; SAE 871250, "Driver's Decision and Control Process During Right-Turning at Intersections (Application of Fuzzy Linguistic Model for Accident Analysis)"; 1987; pp. 250.1-250.8.
M. Maeda et al.; 3rd Fuzzy System Symposium, "An Automobile Tracking Control with a Fuzzy Logic"; Jun. 1987; pp. 61-66.
J. F. Pietranski et al.; PT8-4:00, "Expert Fuzzy Process Control of a Rotary Dryer"; 1987; pp. 1359-1362.

Primary Examiner—Parshotam S. Lall
Assistant Examiner—V. N. Trans
Attorney, Agent, or Firm—Cushman, Darby & Cushman

[57] ABSTRACT

A servo control system includes an actuator controlling a controlled quantity. A device detects the controlled quantity and generates a detection signal representative thereof. The actuator is controlled in response to a target value and the detection signal so that the detected controlled quantity can follow the target value. A device generates a signal representative of an input variable relating only to the target value. The target value is corrected in accordance with the input variable through fuzzy reasoning using predetermined rules.

32 Claims, 11 Drawing Sheets

SERVO CONTROL SYSTEM

BACKGROUND OF THE INVENTION

This invention generally relates to a servo control system using fuzzy reasoning or fuzzy inference. For example, this invention relates to a vehicle wheel speed servo control system or an antiskid control system using fuzzy reasoning.

It is known to use Fuzzy Logic in control systems in order to improve characteristics of the control systems. Since fuzzy control systems generally require many steps of calculations, it is usually difficult to apply the fuzzy systems to real-time control or quickly-responsive control.

SUMMARY OF THE INVENTION

It is an object of this invention to provide an excellent servo control system using fuzzy reasoning.

A servo control system of this invention includes an actuator controlling a controlled quantity. A device detects the controlled quantity and generates a detection signal representative thereof. The actuator is controlled in response to a target value and the detection signal so that the detected controlled quantity can follow the target value. A device generates a signal representative of an input variable relating only to the target value. The target value is corrected in accordance with the input variable through fuzzy reasoning using predetermined rules.

DESCRIPTION OF THE BASIC EMBODIMENT

Figure 1:
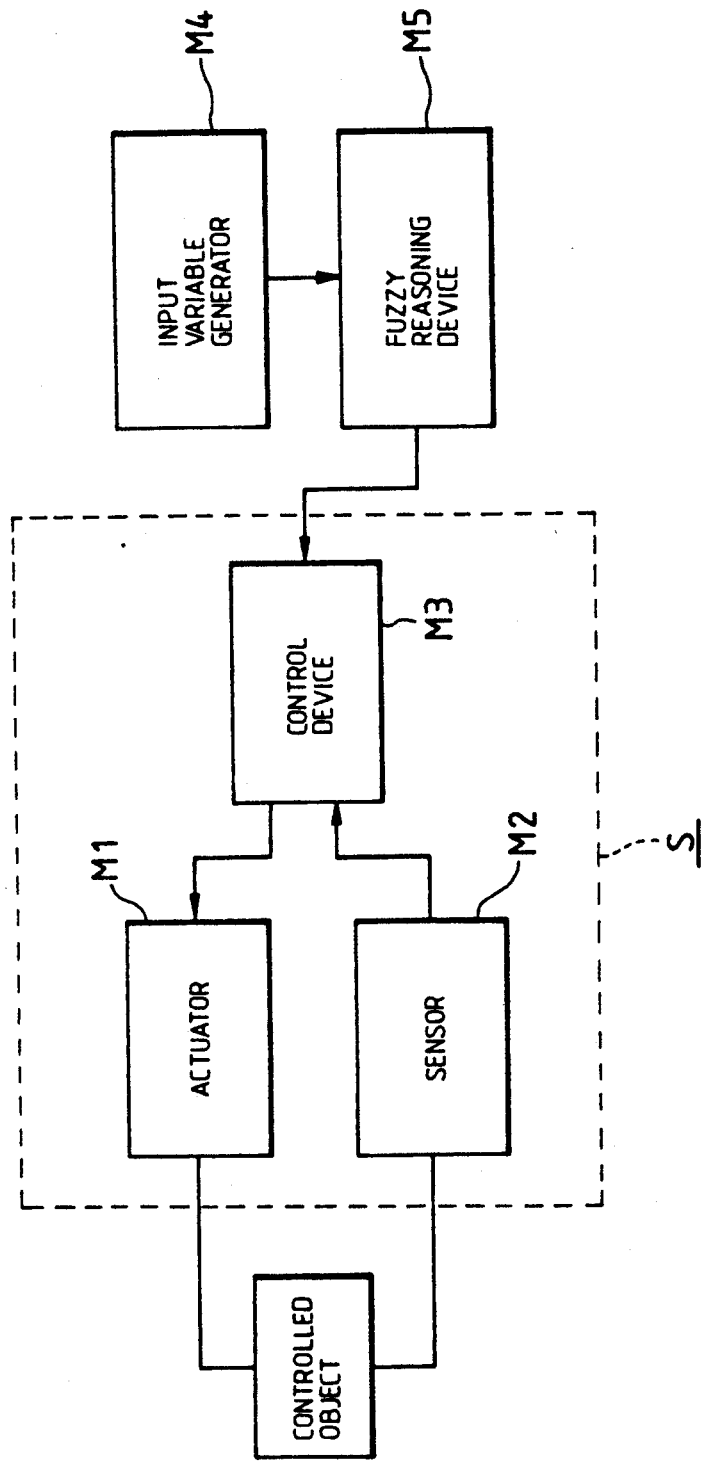
FIG. 1 is a block diagram of a servo control system according to a basic embodiment of this invention.

As shown in FIG. 1, a servo control system according to a basic embodiment of this invention includes a servo section S having an actuator M1 and a sensor M2 connected to a controlled object. The actuator M1 can vary a condition of the controlled object in response to a control signal fed from a control device M3 within the servo section S. The sensor M2 detects the condition of the controlled object and outputs a signal representing an actual value of the condition of the controlled object. The output signal from the sensor M2 is applied to the control device M3. The control device M3 adjusts the actuator M1 so that the actual value of the condition of the controlled object will follow or equal a target value of the condition of the controlled object.

A generator M4 outputs a signal representative of an input variable or variables relating only to the target value of the condition of the controlled object. The output signal from the input variable generator M4 is applied to a fuzzy reasoning device M5. The fuzzy reasoning device M5 executes a fuzzy reasoning process or a fuzzy inference process and corrects the target value of the condition of the controlled object in accordance with the input variable or variables. Fuzzy sets are predetermined in accordance with the input variable or variables relating only to the target value of the condition of the controlled object, so that the number of rules used in the fuzzy reasoning process is limited suitably and a time spent in calculations of the fuzzy reasoning process is short.

DESCRIPTION OF THE SPECIFIC EMBODIMENT

A vehicle antiskid servo control system according to a specific embodiment of this invention will be described with reference to drawings.

Figure 2:
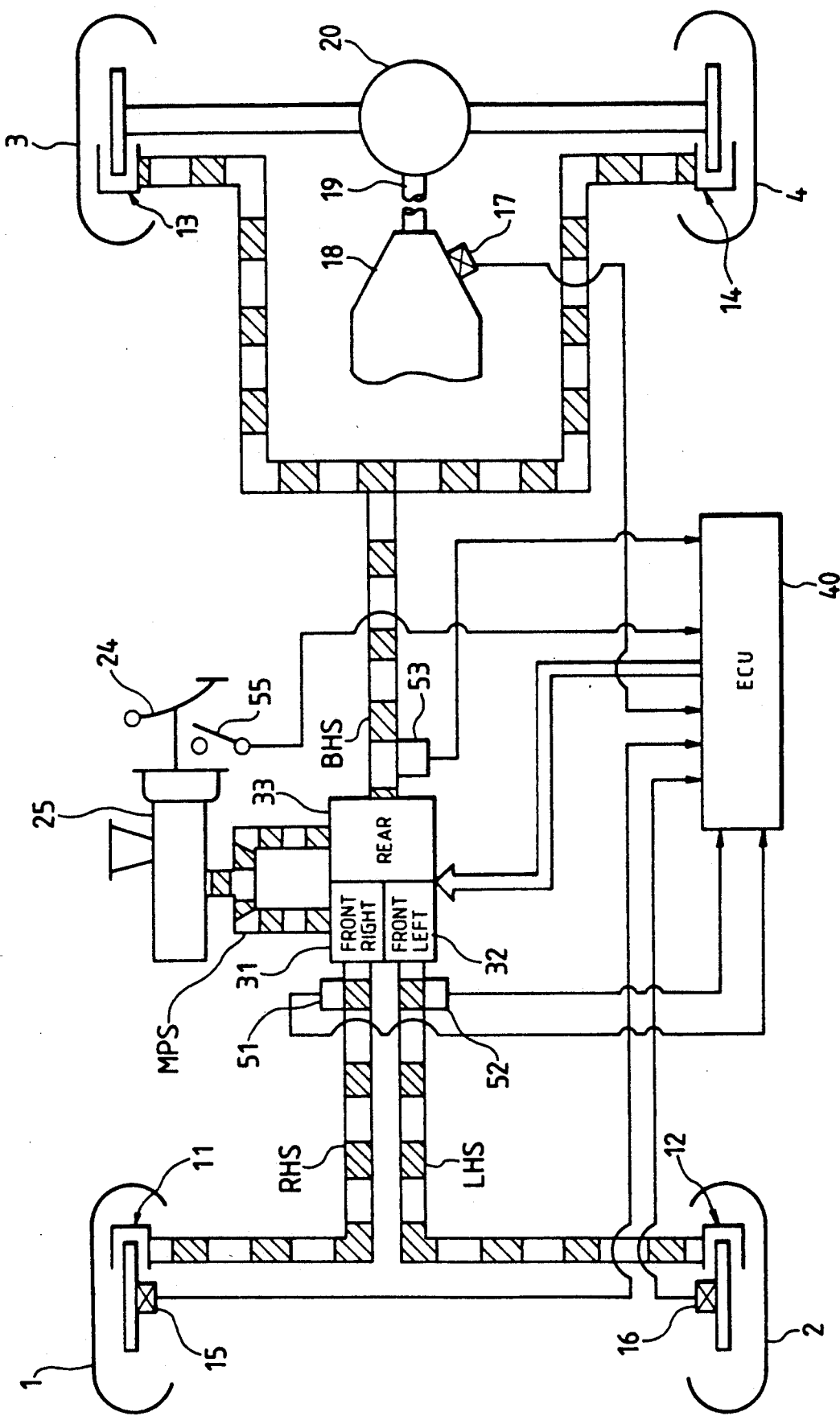
FIG. 2 is a diagram of an antiskid control system according to a specific embodiment of this invention.

As shown in FIG. 2, a vehicle has a front-right wheel 1, a front-left wheel 2, a rear-right wheel 3, and a rear-left wheel 4 equipped with respective hydraulic brake units 11, 12, 13, and 14. Speed sensors 15 and 16 associated with the front wheels 1 and 2 detect rotational speeds of the front wheels 1 and 2 respectively. The speed sensors 15 and 16 are preferably of the electromagnetic pickup type. A transmission 18 has an output shaft 19 coupled to the rear wheels 3 and 4 via a differential gear 20. A speed sensor 17 connected to the transmission 18 indirectly detects rotational speed of the rear wheels 3 and 4.

A master cylinder 25 preferably of the tandem type generates hydraulic pressure in response to depression of a brake pedal 24. The hydraulic pressure can be transmitted from the master cylinder 25 to the hydraulic brake units 11-14 via a hydraulic line arrangement MPS. The hydraulic brake units 11-14 exert braking forces on the respective wheels 1-4 in accordance with hydraulic braking pressures equal to applied hydraulic pressures Hydraulic pressure adjustment units 31, 32, and 33 interposed in the hydraulic line arrangement MPS serve to vary the hydraulic pressures applied to the hydraulic brake units 11-14. The hydraulic pressure applied to the front-right brake unit 11, the hydraulic pressure applied to the front-left brake unit 12, and the hydraulic pressure applied to the rear brake units 13 and 14 are mutually-independently controllable. An electronic control unit (ECU) 40 serves to control the hydraulic pressure adjustment units 31-33.

The hydraulic line arrangement MPS includes a hydraulic line RHS extending between the brake pressure adjustment unit 31 and the front-right brake unit 11, a hydraulic line LHS extending between the brake pressure adjustment unit 32 and the front-left brake unit 12, and a hydraulic line BHS extending between the brake pressure adjustment unit 33 and the rear brake units 13 and 14. The pressure in the hydraulic line RHS, that is, the pressure applied to the front-right brake unit 11, is detected by a pressure sensor 51. The pressure in the hydraulic line LHS, that is, the pressure applied to the front-left brake unit 12, is detected by a pressure sensor 52. The pressure in the hydraulic line BHS, that is, the pressure applied to the rear brake units 13 and 14, is detected by a pressure sensor 53.

The ECU 40 receives wheel speed signals from the speed sensors 15–17, and pressure signals from the pressure sensors 51–53. In addition, the ECU 40 receives an output signal from a brake switch 55 which detects depression of the brake pedal 24. The ECU 40 controls the hydraulic pressure adjustment units 31–33 and thereby adjusts rotational speeds of the wheels 1–4 in accordance with the input signals.

Figure 3:
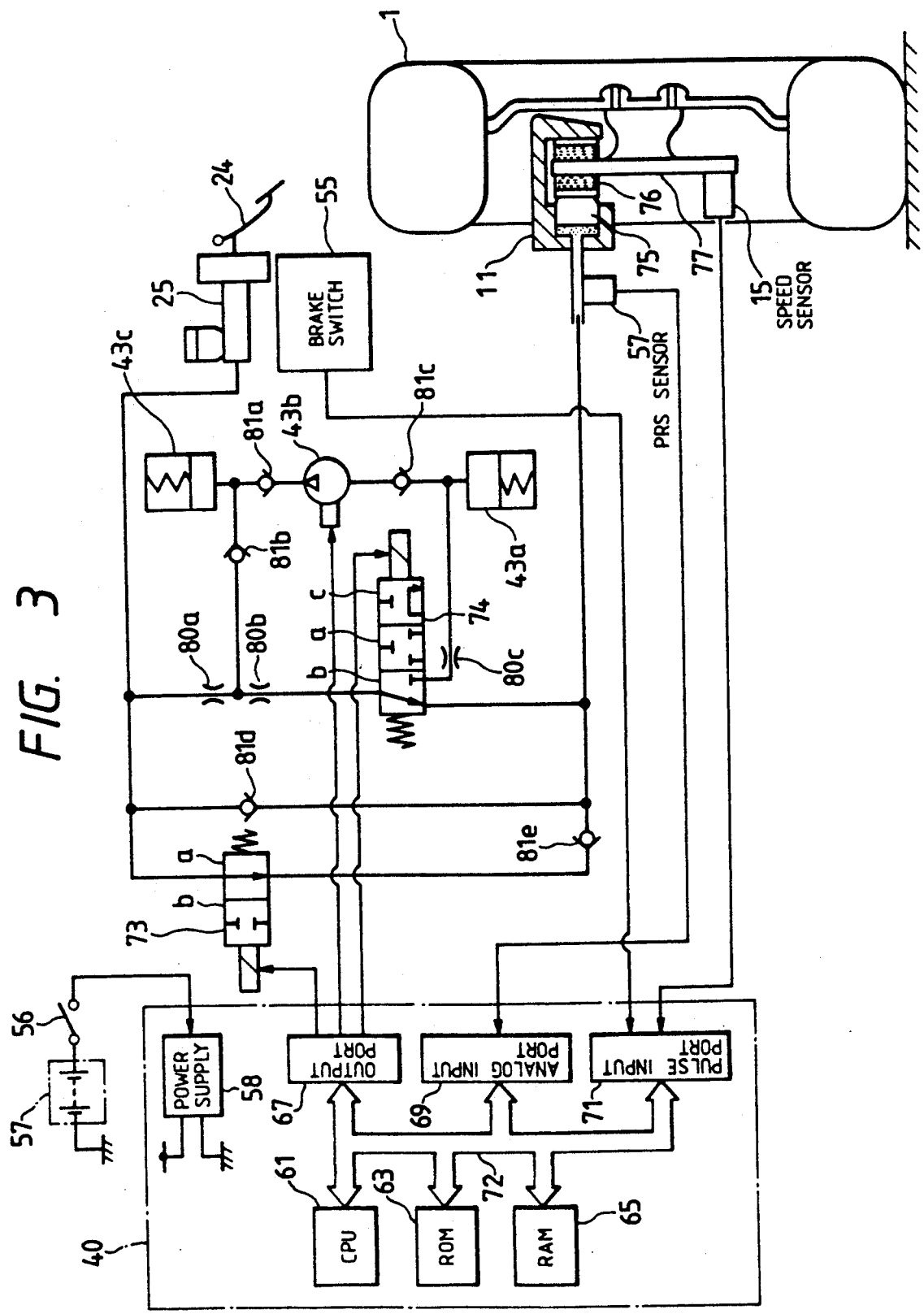
FIG. 3 is a block diagram of the part of the antiskid control system of FIG. 2 which relates to the front-right vehicle wheel.

A braking force applied to the front-right wheel 1, a braking force applied to the front-left wheel 2, and a braking force applied to the rear wheels 3 and 4 are controlled mutually-independently in similar manners. In addition, a structure for controlling the braking force to the front-right wheel 1, a structure for controlling the braking force to the front-left wheel 2, and a structure for controlling the braking force to the rear wheels 3 and 4 are basically similar to each other. Accordingly, only the control of the braking force to the front-right wheel 1 will be described in detail As shown in FIG. 3, the ECU 40 includes a power supply 58 connected to a battery 57 via an ignition switch 56. The power supply 58 derives a constant voltage from the voltage across the battery 57. Components of the ECU 40 are powered by the constant voltage outputted from the power supply 58. In the ECU 40, a central processing unit (CPU) 61, a read-only memory (ROM) 63, a random-access memory (RAM) 65, an output port 67, an analog input port 69, and a pulse input port 71 are mutually connected via a bus 72, forming a logical operation circuit or a microcomputer. The analog input port 69 receives an output signal from the pressure sensor 57. The pulse input port 71 receives output signals from the speed sensor 15 and the brake switch 55.

The hydraulic pressure adjustment unit 31 includes a bypass valve 73 and a three-position valve 74. The bypass valve 73 is interposed in a hydraulic line connecting the master cylinder 25 and the front-right brake unit 11. The bypass valve 73 is of the electrically-driven type, being movable between an open position "a" and a closed position "b" in accordance with a control signal fed from the output port 67 of the ECU 40. The bypass valve 73 is normally held in the open position "a".

A hydraulic pressure generator includes a hydraulic fluid reservoir 43a and a pump 43b pressurizing hydraulic fluid supplied from the reservoir 43a. The pressurized fluid is supplied from the pump 43b to the three-position valve 74 via a pressure accumulator 43c. The pump 43b is of the electrically-controllable type, being controlled in accordance with a control signal fed from the output port 67 of the ECU 40.

The three-position valve 74 is movable among three positions "a", "b", and "c". When the three-position valve 74 assumes the first position "a", a hydraulic line to the hydraulic brake unit 11 is blocked so that the hydraulic pressure in the brake unit 11 is held essentially constant. When the three-position valve 74 assumes the second position "b", the hydraulic brake unit 11 is connected to the high pressure accumulator 43c so that the pressure in the brake unit 11 is increased. When the three-position valve 74 assumes the third position "c", the hydraulic brake unit 11 is connected to the low pressure reservoir 43a so that the pressure in the brake unit 11 is decreased. The three-position valve 74 is normally held in the second position "b". The three-position valve 74 is of the electrically-driven type, being moved in accordance with a control signal fed from the output port 67 of the ECU 40.

The hydraulic brake unit 11 includes a movable piston 75, a brake pad 76 moved by the piston 75, and a disc plate 77 rotating together with the vehicle wheel 1. The piston 75 responds to the applied hydraulic pressure. When a hydraulic pressure acts on the piston 75, the piston 75 forces the brake pad 76 into contact with the disc plate 77 and thereby brakes the vehicle wheel 1.

The three-position valve 74 is connected to the master cylinder 25 via orifices 80a and 80b. The orifice 80b and check valves 81a and 81b are disposed between the three-position valve 74 and the pump 43b. A check valve 81c is disposed between the pump 43b and the reservoir 43a. An orifice 80c is disposed between the three-position valve 74 and the reservoir 43a. A check valve 81e is disposed between the bypass valve 73 and the hydraulic brake unit 11. A check valve 81d is connected across a series combination of the bypass valve 73 and the check valve 81e.

When the brake pedal 24 is depressed, the master cylinder 25 generates a hydraulic pressure. The generated hydraulic pressure travels to the hydraulic brake unit 11 via the bypass valve 73, braking the vehicle wheel 1. As the braking force is excessively stronger, the vehicle wheel 1 tends to be locked and the slip ratio of the vehicle wheel 1 increases.

When the ECU 40 detects that the slip ratio of the vehicle wheel 1 exceeds a reference value, the ECU 40 starts antiskid control The output signal from the vehicle wheel speed sensor 15 is used in the detection of the increase in the slip ratio of the vehicle wheel 1.

At a beginning of the antiskid control, the ECU 40 activates the pump 43b. It should be noted that the pump 43b may be controlled independent of the beginning of the antiskid control so as to always maintain a high pressure in the pressure accumulator 43c. Then, the ECU 40 moves the bypass valve 73 from the open position "a" to the closed position "b", blocking the direct connection between the master cylinder 25 and the hydraulic brake unit 11. In this case, the master cylinder 25 and the hydraulic brake unit 11 are connected via the three-position valve 74 and the orifices 80a and 80b.

During the antiskid control, the ECU 40 adjusts the three-position valve 74 so that an actual rotational speed Vw of the vehicle wheel 1 will follow or equal a target rotational speed Vw* of the vehicle wheel 1. In the ECU 40, the target rotational speed of the vehicle wheel 1 is determined on the basis of fuzzy reasoning or fuzzy inference. The target rotational speed of the vehicle wheel 1 is preferably designed so as to minimize the distance traveled by the vehicle during an interval from the start of the braking to the stop of the vehicle. During the adjustment of the three-position valve 74, the three-position valve 74 is changed among its positions "a", "b", and "c", and thus the hydraulic pressure applied to the hydraulic brake unit 11 is kept constant, increased, or decreased in order to make the actual hydraulic braking pressure equal to a command or target hydraulic braking pressure.

Figure 4:
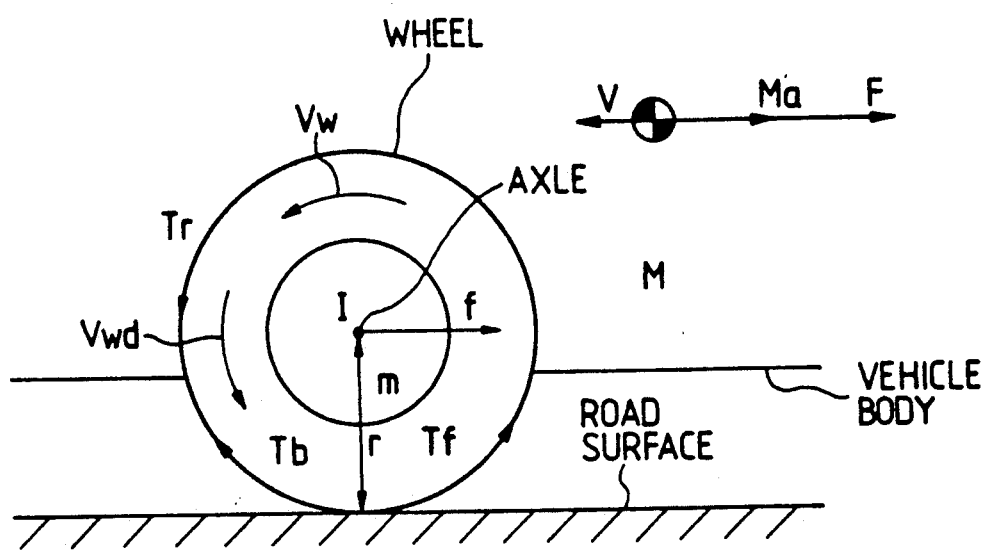
FIG. 4 is a diagram showing forces acting on the vehicle wheel.
Figure 5:
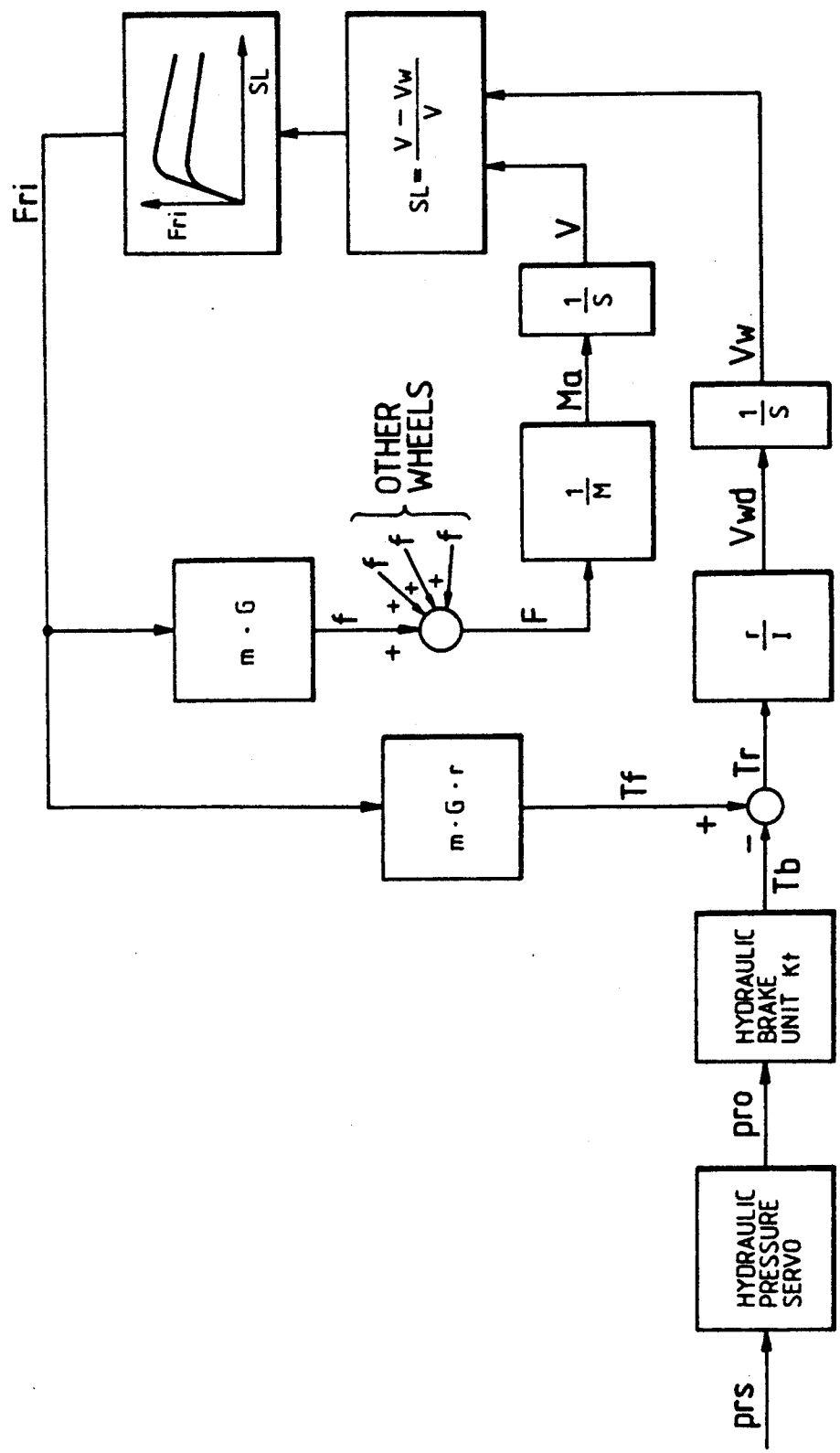
FIG. 5 is a diagram of a model of the brake section of the antiskid control system of FIG. 2.

The ECU 40 forms an integral-added optimal regulator which will be described with reference to FIGS. 4 and 5. In FIG. 5, an operator "1/S" corresponds to time integral.

When the ECU 40 orders a hydraulic pressure "prs", a hydraulic pressure "pro" is applied to the hydraulic brake unit from a hydraulic servo mechanism including the hydraulic pressure sensor, the ECU, and the hydraulic line arrangement.

The hydraulic brake unit generates a braking torque Tb causing braking of the vehicle wheel. The braking torque Tb is determined by a coefficient Kt and the hydraulic pressure "pro". The coefficient Kt is determined by a structure and characteristics of the hydraulic brake unit.

The vehicle wheel rotates at a speed Vw. The vehicle moves at a speed V.

A slip ratio SL equals a difference between the wheel speed Vw and the vehicle speed V which is divided by the vehicle speed V. A coefficient Fri of friction between the vehicle wheel and a road surface is determined through non-linear calculation or operation.

A friction torque Tf applied to the vehicle wheel from the road surface is determined by the friction coefficient Fri, a partial weight "m" of the vehicle born by one vehicle wheel, a gravitational acceleration G, and an effective radius "r" of the vehicle wheel.

A difference between the friction torque Tf and the braking torque Tb equals a rotation torque Tr acting on the vehicle wheel.

A rotational acceleration Vwd of the vehicle wheel is determined by the rotation torque Tr, the effective radius "r" of the vehicle wheel, and a rotational inertia I of the vehicle wheel. An integral of the rotational acceleration Vwd equals the rotational speed Vw of the vehicle wheel.

A force "f" acting on an axle is determined by the friction coefficient Fri, the vehicle partial weight "m", and the gravitational acceleration G.

This force "f" is exerted on the vehicle body by one vehicle wheel. A total force F applied to the vehicle body from the four vehicle wheels equals a sum of the forces "f" exerted on the vehicle body by the respective vehicle wheels.

An acceleration Ma of the vehicle body corresponds to the force F divided by a weight M of the vehicle body. An integral of the vehicle acceleration Ma equals the speed V of the vehicle body.

The model of a brake section shown in FIG. 5 is used in the formation of the integral-added optimal regulator which performs optimal feedback control.

The optimal feedback control will be described hereinafter. In the following description, the characters X, y, u, A, B, C, F, S, Q, R, G1, and G2 denote vectors or matrixes. The character $A^T$ denotes the transposed matrix with respect to a matrix A. The character $A^{-1}$ denotes the inverse matrix with respect to a matrix A.

In general, the behavior of a controlled object is expressed by state and output equations as follows:

$$X(k+1) = A \cdot X(k) + B \cdot u(k) \quad (1)$$

$$y(k) = C \cdot X(k) \quad (2)$$

where the character X (k) represents state variables of the controlled object; the character u (k) represents an input vector or controlled input quantities of the controlled object; and the character y (k) represents an output vector or control output quantities of the controlled object. The adscript "k" denotes a sampling moment. The adscript "k+1" denotes a sampling moment subsequent to the sampling moment "k".

In cases where a dynamic model of the controlled object is determined and the matrixes A, B, and C are determined, feedback gain matrix F are calculated from the state variables X (k) and the control outputs y (k), and the controlled input quantities u (k) for adjusting the control outputs y (k) to control targets y*(k) are determined so that the object can be controlled optimally.

In this embodiment, the dynamic model of the controlled object, that is, the brake section, has a structure of FIG. 5 which is determined on the basis of equations of motions.

In this embodiment, to remove a steady-state error or deviation between a target value and an actual value of the control output, an integral of a difference between the target value and the actual value is incorporated into the state variables X (k) and thus the system is expanded. The expanded state variables X (k), the controlled input u (k), and the control output y (k) are given as follows:

$$X(k) = [Vw \ Vwd \ INT\Delta Vw] \quad (3)$$

$$u(k) = [p^*] \quad (4)$$

$$y(k) = [Vw] \quad (5)$$

where the character $INT\Delta Vw$ denotes an integral of the difference between the target value and the actual value.

Optimal feedback gains F will be described hereinafter. In this embodiment, the optimal feedback gains F are given by an equation as follows:

$$F = -(R + B^T \cdot S \cdot B)^{-1} \cdot mB^T \cdot S \cdot A \quad (6)$$

where the character S denotes a solution of the following Riccati equation.

$$S = A^T \cdot S \cdot A - A^T \cdot S \cdot B(B^T \cdot S \cdot B + R)^{-1} \cdot B^T \cdot S \cdot A + Q \quad (7)$$

where the characters Q and R denote parameters which were chosen optimally through computer simulation designed to minimize the following performance index J.

$$J = \sum_{k=0}^{\infty} [X^T(k+1) \cdot Q \cdot X(k+1) + u^T(k+1) \cdot R \cdot u(k+1)] \quad (8)$$

In this embodiment, simulation was reiterated while the parameters Q and R in the performance index J were changed. Optimal parameters were determined on the basis of the behavior of the brake section derived through the reiterative simulation. The optimal feedback gains F were determined in accordance with the optimal parameters.

When the optimal feedback gains F are determined in this way, the controlled input u (k+1) is expressed by the following equation.

$$u(k+1) = -F \cdot X(k+1) \quad (9)$$

Since the response of the control system has a lag, the values X (k+1) can not be used directly. In view of this fact, the right-hand side of the equation (1) is substituted for the term X (k+1) in the equation (9) and the following equation is derived.

$$u(k+1) = -(F \cdot A \cdot X(k) + F \cdot B \cdot u(k)) \quad (10)$$

When $G1 = F \cdot A$ and $G2 = F \cdot B$, the equation (10) is converted into an equation (10') as follows:

$$u(k+1) = -(G \cdot X(k) + G2 \cdot u(k)) \quad (10')$$

In this embodiment, the parameters G1 and G2 were calculated from the values F, A, and B and were specifically given as:

$$G1 = [66.85 \ 723.4 \ 3162.3]$$

$$G2 = [-18.49]$$

It is preferable that the parameters G1 and G2 dependent on the vehicle speed were predetermined, and the currently-used values G1 and G2 are changed in accordance with the current vehicle speed by referring to the predetermined relationship between the values G1 and G2 and the vehicle speed. For example, the parameters G1 and G2 are chosen so that the speed of convergence of the system drops with the vehicle speed.

The system controlling the controlled object will be described further with reference to FIG. 6 in which an operator "1/S" corresponds to time quadrature or integral, and an operator "S" corresponds to time differential.

Figure 6:
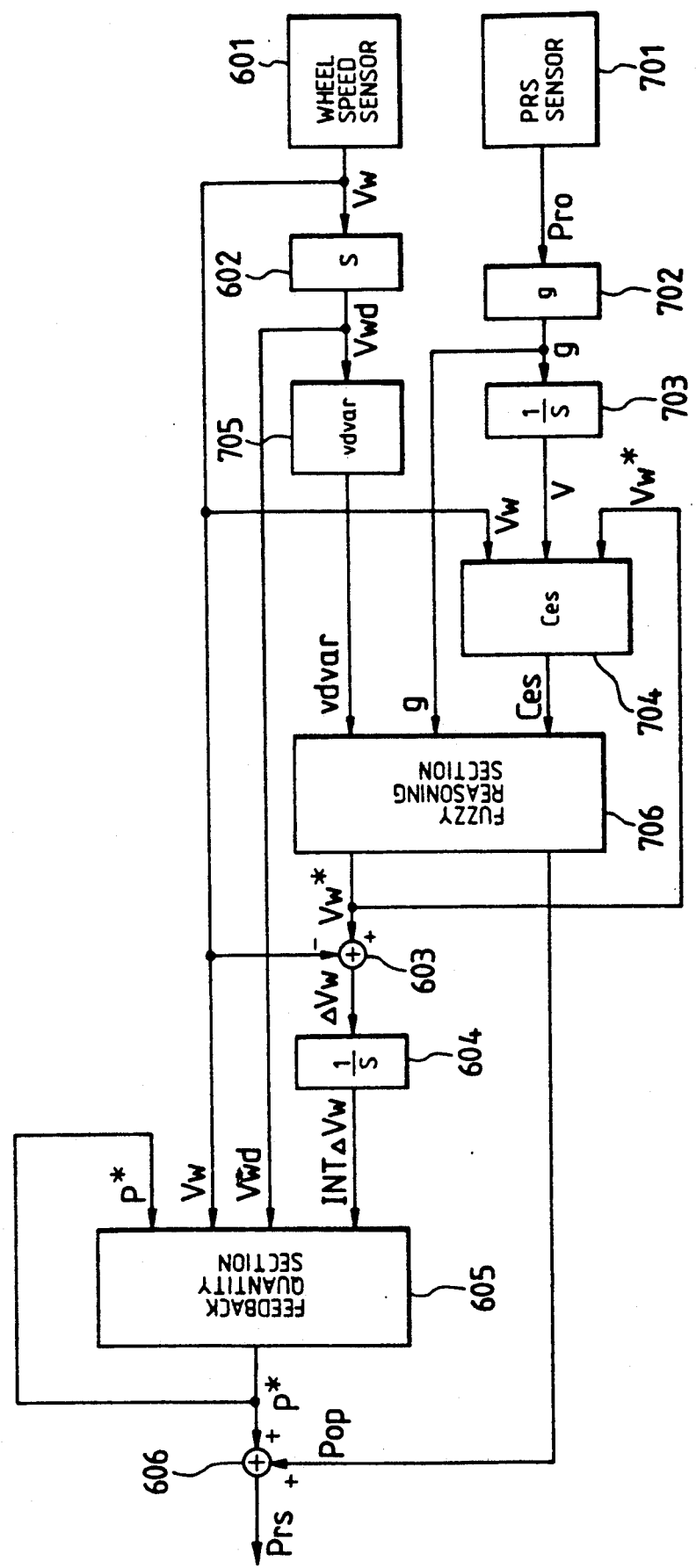
FIG. 6 is a diagram of the control section of the antiskid control system of FIG. 2.

As shown in FIG. 6, a sensor 601 detects the current speed Vw of a vehicle wheel. A differentiator 602 derives the current acceleration Vwd of the vehicle wheel from the current vehicle wheel speed Vw. A section 705 calculates the amplitude "vdvar" of a variation in the wheel acceleration Vwd.

A sensor 701 detects the current hydraulic pressure "pro" applied to a brake unit. A section 702 estimates the deceleration "g" of the vehicle body from the detected hydraulic pressure "pro" Generally, at small slip ratios of a vehicle wheel, a vehicle body acceleration or deceleration "g" remains in a given relationship with a hydraulic braking pressure "pro" The section 702 uses this given relationship in estimating the vehicle acceleration "g". An integrator 703 calculates the current speed V of the vehicle body from the vehicle acceleration "g".

The vehicle body acceleration "g" may be detected by an acceleration sensor mounted on the vehicle.

A section 704 calculates an index Ces from the wheel speed Vw, the vehicle speed V, and a target speed Vw* of the vehicle wheel. The index Ces represents the degree of an insufficiency of the hydraulic pressure upon an abrupt change in conditions of a road surface, for example, an abrupt change of the friction coefficient of a road surface from a low value to a high value.

A section 706 determines the target wheel speed Vw* and a corrective hydraulic pressure Pop in accordance with the acceleration amplitude "vdvar", the vehicle deceleration "g", and the index Ces through a fuzzy reasoning process or a fuzzy inference process.

A subtracter 603 calculates a deviation ΔVw between the actual wheel speed Vw and the target wheel speed Vw* A section 604 calculates an integral INTΔVw of the speed deviation ΔVw.

A section 605 determines a current target hydraulic pressure P* in accordance with the wheel speed Vw, the wheel acceleration Vwd, the deviation integral INTΔVw, and the preceding target hydraulic pressure P*.

An adder 606 calculates a sum of the target hydraulic pressure P* and the corrective hydraulic pressure Pop which equals a final target hydraulic pressure Prs. The brake unit is controlled in accordance with the final target hydraulic pressure Prs.

Fuzzy reasoning will be described hereinafter. In general, fuzzy reasoning uses a plurality of rules each composed of a condition part and a conclusion part. One example of such rules is as follows "If x is A, y is B." The characters "x" and "y" denote an input variable and an output variable respectively The characters A and B denote fuzzy sets having indefinite boundaries.

Fuzzy sets are defined by membership functions which represent the degrees of connections or belonging of respective variables to the fuzzy sets.

In respect of the previously-mentioned rule, the degree of connection of the input variable "x" to the fuzzy set A is calculated as a membership value on the basis of the related membership function. The calculated membership value is defined as the degree of satisfaction of the rule. The degrees of satisfaction of the other rules are derived similarly.

In the fuzzy reasoning, an output y0 is determined by calculating the central point or center of gravity of the output variable "y" from the degrees of connections of the output variable "y" to the respective fuzzy sets.

It is now assumed that a rule 1 and a rule 2 are determined as described hereinafter and membership functions are determined as shown in FIG. 12.

Rule 1: if x1=A11 then y=B1
Rule 2: if x1=A21 and x2=A22 then y=B2

Figure 12A:
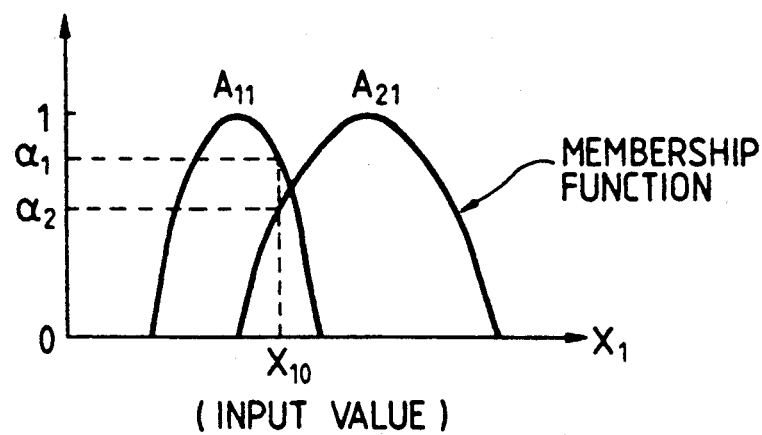
FIGS. 12(a), 12(b), and 12(c) are graphs showing membership functions used in fuzzy reasoning.
Figure 12B:
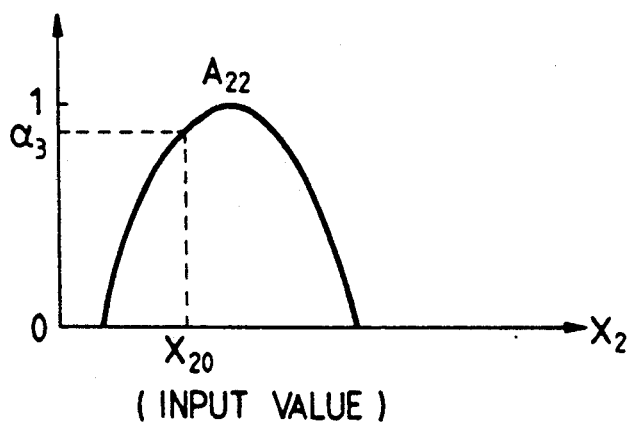

When the input variable x1 equals a value x1 10 and the input variable x2 equals a value x20, the degree of satisfaction of the rule 1 is given by a value α1 as shown in FIG. 12(a) and the degree of satisfaction of the rule 2 is given by a value α2, as understood from FIGS. 12(a) and 12(b), which corresponds to the smaller of membership values. It should be noted that the value α2 is smaller than a value α3.

Figure 12C:
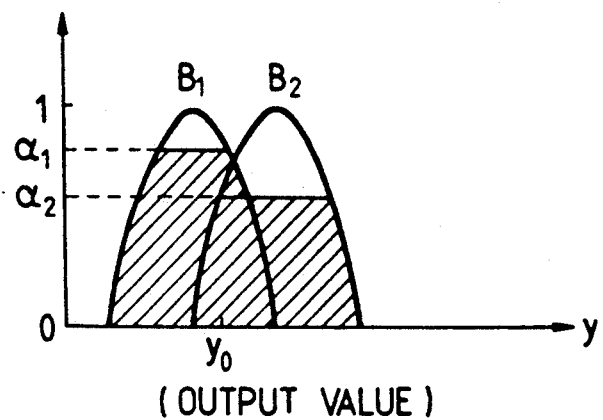

As shown in FIG. 12(c), fuzzy sets B1 and B2 of the output variable "y" are cut with the membership values α1 and α2 calculated on the basis of the rules respectively, so that logical addition parts of the fuzzy sets B1 and B2 which correspond to hatched regions are obtained. The position of the center of gravity of these logical addition parts determines the output value y0 based on the fuzzy reasoning.

In this embodiment, the target wheel speed Vw* is given as follows:

$$Vw^* = (Vop + (1 - 0.12)) \cdot V$$

A reference value is chosen to equal 88% of the vehicle speed V. A corrective value Vop measured from this reference value is calculated through the fuzzy reasoning. A corrective hydraulic pressure quantity Pop is also determined through the fuzzy reasoning.

In view of characteristics of the antiskid control apparatus, this embodiment uses the vehicle body deceleration "g", the acceleration amplitude "vdvar", and the index Ces as input variables related to the target pressure P* and the target wheel speed Vw*. The acceleration amplitude "vdvar" is given as follows A maximal value and a minimal value of the wheel acceleration are detected. A difference between the detected maximal and minimal values of the wheel acceleration is calculated. The acceleration amplitude "vdvar" is set to the calculated difference. Since the maximal and minimal values of the wheel acceleration are updated successively, the acceleration amplitude "vdvar" is also updated. The index Ces is given by the following equations:

$$Ces = \Sigma(Vw - Vw^*)/V \quad (Vw > Vw^*)$$
$$Ces = 0 \quad (Vw \leq Vw^*)$$

Figure 7A:
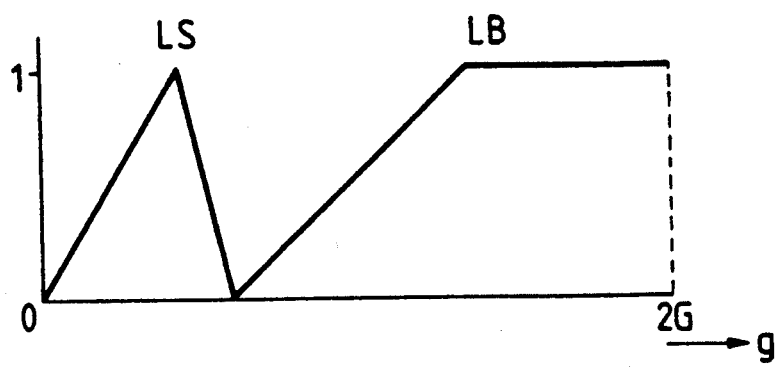
FIGS. 7(a), 7(b), and 7(c) are graphs showing membership functions of input variables used in fuzzy reasoning of the antiskid control system of FIG. 2.
Figure 7B:
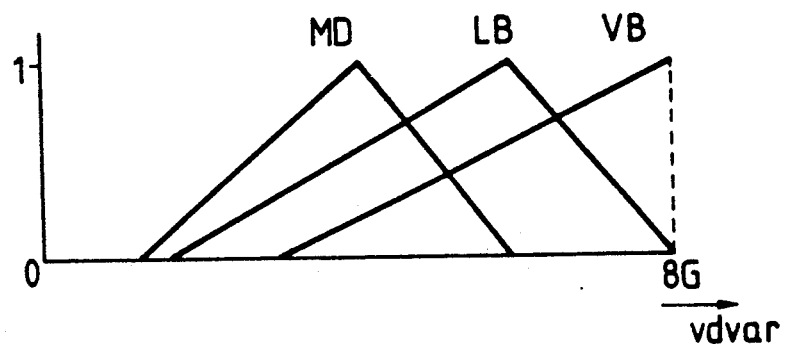
Figure 7C:
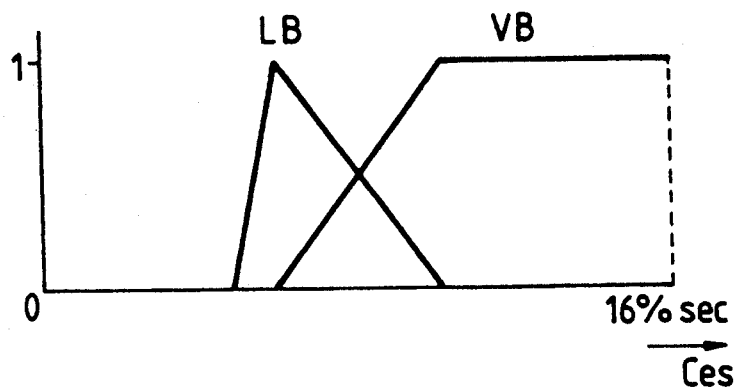

Membership functions and fuzzy sets LS, MD, LB, and VB of the respective input variables "g", "vdvar", and Ces are given as shown in FIGS. 7(a), 7(b), and 7(c). The fuzzy set LS corresponds to the concept of "slightly small". The fuzzy set MD corresponds to the concept of "mediate". The fuzzy set LB corresponds to the concept of "slightly large". The fuzzy set VB corresponds to the concept of "large".

Fuzzy sets of the output variables Vop and Pop are determined by use of representatives as follows. The corrective wheel speed value Vop (%) equals −8, 0, 4, and 8 for fuzzy sets VS, MD, LB, and VB respectively. The corrective hydraulic pressure value Pop (kgf/cm$^2$) equals 10 and 40 for fuzzy sets LB and VB respectively. The fuzzy set VS correspond to the concept of "small". The fuzzy set MD correspond to the concept of "mediate". The fuzzy set LB correspond to the concept of "slightly large". The fuzzy set VB correspond to the concept of "large".

This embodiment uses the following six rules connecting the input variables and the output variables.

1. if (g = LB)
    then Vop = VS
2. if (g = LS & vdvar = VB)
    then Vop = VB
3. if (g = LS & vdvar = LB)
    then Vop = LB
4. if (g = LS & vdvar = MD)
    then Vop = MD
5. if (Ces = VB)
    then Pop = VB
6. if (Ces = LB
    then Pop = LB For example, the rule 1 means that if the vehicle body acceleration "g" is slightly large (LB), the friction coefficient of the road surface is thought to be high as in a normal asphalt road having a friction coefficient which peaks at a slip ratio of about 20% and thus the corrective wheel speed Vop is set to a small (VS) value relative to a reference "88%". The rule 4 means that if the vehicle body acceleration "g" is slightly small (LS) and the wheel acceleration amplitude "vdvar" is mediate (MD), the friction coefficient of the road surface is thought to be low as in a frozen road with a friction coefficient peaking at a slip ratio of about 5% which is large with respect to the corrective wheel speed Vop and thus the speed Vop is set to a mediate (MD) value. The rule 5 means that if the index Ces is large (VB), a considerable length of time elapsed since a change from a road of a low friction coefficient to a road of a high friction coefficient and thus the corrective hydraulic pressure Pop is set to a large (VB) value.

Membership values calculated from condition parts of the respective rules are defined as degrees of satisfaction of the rules. Fuzzy reasoning is performed by calculating a weighted average of conclusion parts of the respective rules with weights being equal to the degrees of satisfaction of the rules. Specifically, the corrective wheel speed Vop is calculated from an average relating to the rules 1, 2, 3, and 4. The corrective hydraulic pressure Pop is calculated from an average relating to the rules 5 and 6.

The weighted average process reduces the calculation load on the microcomputer. The weighted average process causes the fuzzy sets of the output variables Vop and Pop to be defined by representatives.

Fuzzy sets of the output variables Vop and Pop may be determined by membership functions, and a position of the center of gravity may be calculated on the basis of a plurality of rules.

The previously-mentioned control system is formed by the ECU 40. The ECU 40 operates in accordance with a program stored in the ROM 63. The program starts when the ignition key switch 56 is closed The program includes a main routine and a sub routine related to brake control FIG. 8 is a flowchart of the brake control program.

Figure 8:
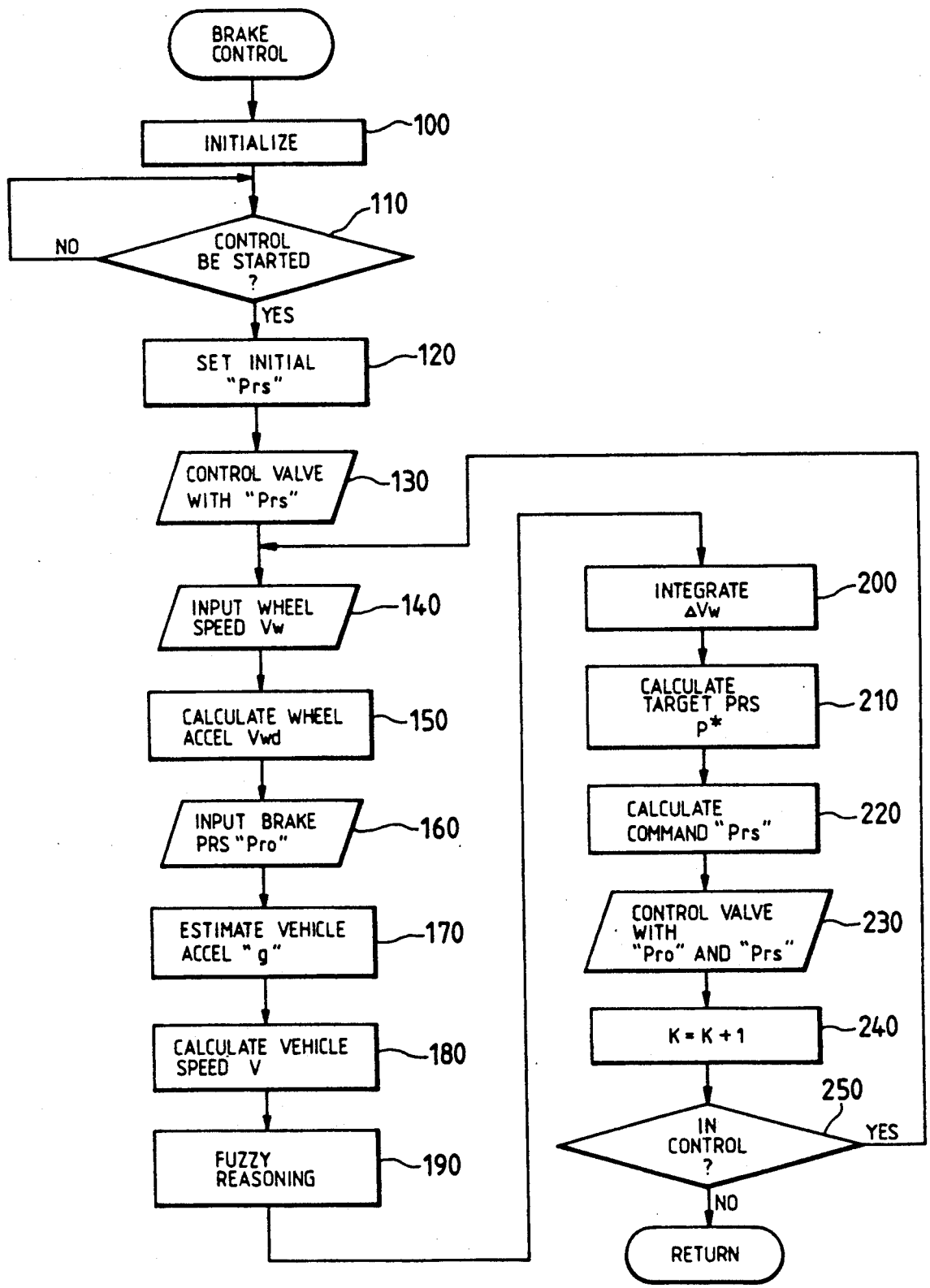
FIG. 8 is a flowchart of a program operating the ECU of FIG. 3.

As shown in FIG. 8, a first step 100 of the brake control program initializes memories or segments of the RAM 65 used in the brake control. After the step 100, the program advances to a step 110.

The step 110 determines whether or not antiskid control should be started. Specifically, the step 110 calculates the current slip ratio of the vehicle wheel. Then, the step 110 compares the calculated slip ratio with a predetermined slip ratio When the calculated slip ratio is equal to or greater than the predetermined slip ratio, that is, when the antiskid control should be started, the program advances to a step 120. When the calculated slip ratio is smaller than the predetermined slip ratio, that is, when the antiskid control should not be started, the program returns to the step 110. The predetermined slip ratio is preferably chosen in view of a reference value of a target slip ratio, a response lag of hydraulic servo control, and requirements that, in the case of a road having a high friction coefficient, the antiskid control should be started only during abrupt braking.

The step 120 calculates an initial command hydraulic pressure "prs" suitable for a moment immediately after the start of the antiskid control.

A step 130 following the step 120 controls the three-position valve 74 in accordance with the initial command hydraulic pressure "prs" so that the actual hydraulic pressure can be equal to the command hydraulic pressure "prs". After the step 130, the program advances to a step 140.

The step 140 derives the current rotational speeds Vw of the respective vehicle wheels 1-4 from the output signals of the speed sensors 15-17.

A step 150 subsequent to the step 140 calculates the accelerations Vwd of the respective wheels 1-4 from the speeds Vw of the respective wheels 1-4 by referring to the following equation:

$$Vwd(k+1) = (Vw(k+1) - Vw(k))/T$$

where the letter T denotes a period of sampling of the wheel speeds Vw which corresponds to an interval between moments of executions of the steps 140. In the following description, the letter T also denotes this period or interval. The process in the step 150 corresponds to the differentiator 602 of FIG. 6.

A step 160 following the step 150 derives the current hydraulic pressures "pro" from the output signals of the pressure sensors 51-53. The derived hydraulic pressures "pro" correspond to braking pressures applied to the hydraulic brake units 11-14.

A step 170 subsequent to the step 160 estimates the current vehicle body acceleration "g" by referring to the following equation:

$$g = K1 \cdot Tpro + K2$$

where the characters K1 and K2 denote preset constants, and the character Tpro denotes a sum of the detected hydraulic pressures "pro". The process in the step 170 corresponds to the estimating section 702 of FIG. 6.

A step 180 subsequent to the step 170 calculates the current vehicle speed V from the estimated vehicle acceleration "g" by referring to the following equation:

$$V(k+1) = V(k) + Ma(k) \cdot T$$

where the character Ma(k) denotes the time-dependent vehicle acceleration. The process in the step 180 corresponds to the integrator 703 of FIG. 6.

A block 190 following the step 180 calculates target rotational speeds Vw* of the respective wheels 1-4 and corrective hydraulic pressure quantities Pop through fuzzy reasoning. The process in the block 190 corresponds to the sections 704-706 of FIG. 6.

A step 200 subsequent to the block 190 calculates integrals INTΔVw of differences ΔVw between the actual speeds Vw and the target speeds Vw* of the respective wheels 1-4 by referring to the following equation:

$$INT\Delta Vw(k+1) = INT\Delta Vw(k) + (Vw^*(k) - Vw(k)) \cdot T$$

The process in the step 200 corresponds to the subtracter 603 and the integrator 604 of FIG. 6.

A step 210 subsequent to the step 200 determines target hydraulic pressures P* related to the respective vehicle wheels 1-4. The target hydraulic pressures P* correspond to the controlled inputs and are calculated by referring to the following equation based on the equation (10'):

$$P^*(k+1) = -(G1 \cdot X(k) + G2 \cdot P^*(k))$$

The process in the step 210 corresponds to the feedback section 605 of FIG. 6.

A step 220 subsequent to the step 210 calculates command hydraulic pressures "prs" from the target hydraulic pressures P* and the corrective hydraulic pressure quantities Pop by referring to the following equation:

$$prs(k) = P^*(k) + Pop(k)$$

The process in the step 220 corresponds to the adder 606 of FIG. 6.

A step 230 following the step 220 controls the three-position valves 74 for the front-right wheel 1, the front-left wheel 2, and the rear wheels 3 and 4 in accordance with the command hydraulic pressures "prs". Specifically, control patterns of the three-position valves 74 are selected and the three-position valves 74 are driven in accordance with the selected patterns so that the actual hydraulic braking pressures related to the respective wheels 1-4 can be equal to the command hydraulic pressures "prs(k+1)" in one sampling time T. The process in the step 230 corresponds to the hydraulic servo control.

A step 240 following the step 230 increments the value "k" by "1", the value "k" representing the sampling moment. After the step 240, the program advances to a step 250.

The step 250 determines whether or not the antiskid control should be continued. Specifically, the step 250 determines whether the brake pedal 24 is depressed or released on the basis of the output signal from the brake switch 55. In addition, the step 250 determines whether or not the vehicle has stopped on the basis of the actual vehicle speed. When the brake pedal 24 is released or when the vehicle has stopped, that is, when the antiskid control should not be continued, the brake control routine ends and the program returns to the main routine When the brake pedal 24 is being depressed and the vehicle is moving, that is, when the antiskid control should be continued, the program returns to the step 140.

Figure 9:
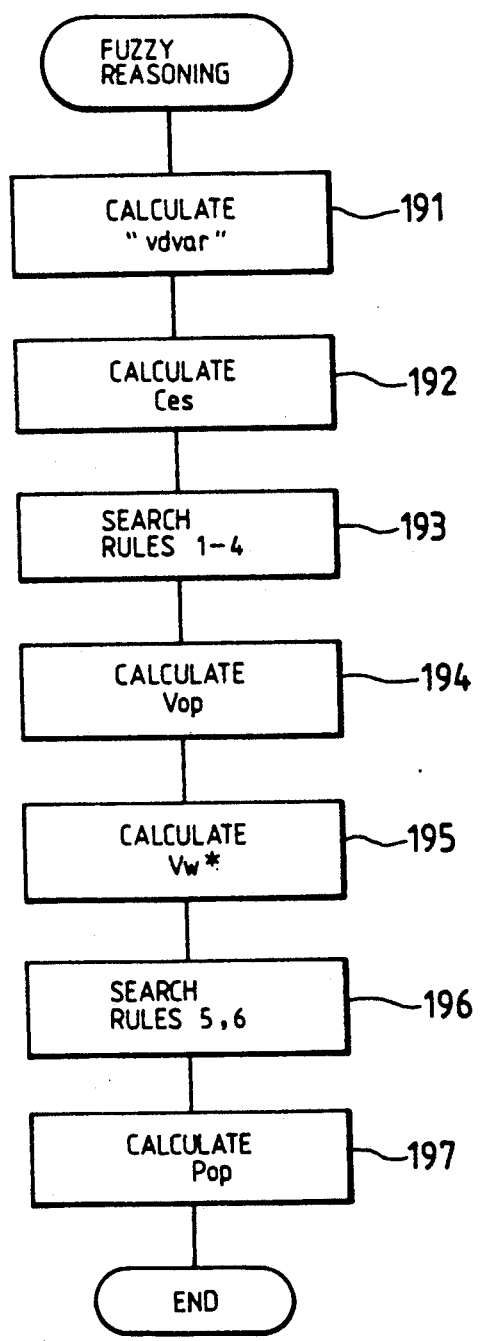
FIG. 9 is a diagram of the internal structure of the fuzzy reasoning block of FIG. 8.

As shown in FIG. 9, the fuzzy reasoning block 190 has a first step 191 calculating amplitudes "vdvar" of variations in the accelerations of the respective vehicle wheels 1-4 Specifically, the step 191 derives maximal values and minimal values of the respective wheel accelerations Vwd. Then, the step 191 calculates differences between the maximal values and the minimal values of the respective wheel accelerations, setting the variation amplitudes "vdvar" to the calculated differences.

A step 192 subsequent to the step 191 calculates an index Ces by referring to the following equations:

$$Ces = \Sigma(Vw - Vw^*)/V \quad (Vw > Vw^*)$$
$$Ces = 0 \quad (Vw \leq Vw^*)$$

A step 193 following the step 192 searches membership functions of the input variables "g" and "vdvar" and then determines the degrees of satisfaction of the respective rules 1-4.

A step 194 subsequent to the step 193 calculates a weighted average of conclusion parts of the respective rules 1-4 with weights being equal to the degrees of satisfaction of the respective rules 1-4. The step 194 sets the corrective wheel speed Vop to the calculated average. For example, when the degrees of satisfaction of the rules 1, 2, 3, and 4 are equal to values α1, α2, α3, and α4 respectively, the corrective wheel speed Vop is given by the following equation:

$$Vop = (-8 \cdot \alpha1 + 8 \cdot \alpha2 + 4 \cdot \alpha3 + 0 \cdot \alpha4)/(\alpha1 + \alpha2 + \alpha3 + \alpha4)$$

A step 195 subsequent to the step 194 calculates target rotational speeds Vw* of the respective wheels 1-4 by referring to the following equation:

$$Vw^* = (0.88 + Vop) \cdot V$$

A step 196 following the step 195 searches membership functions of the input variable Ces and then determines the degrees of satisfaction of the respective rules 5 and 6.

A step 197 subsequent to the step 196 calculates a weighted average of conclusion parts of the respective rules 5 and 6 with weights being equal to the degrees of satisfaction of the respective rules 5 and 6. The step 197 sets the corrective hydraulic pressure value Pop to the calculated average For example, when the degrees of satisfaction of the rules 5 and 6 are equal to values $\alpha 5$ and $\alpha 6$ respectively, the corrective hydraulic pressure value Pop is given by the following equation:

$$Pop = (40 \cdot \alpha 5 + 10 \cdot \alpha 6)/(\alpha 5 + \alpha 6)$$

Figure 10:
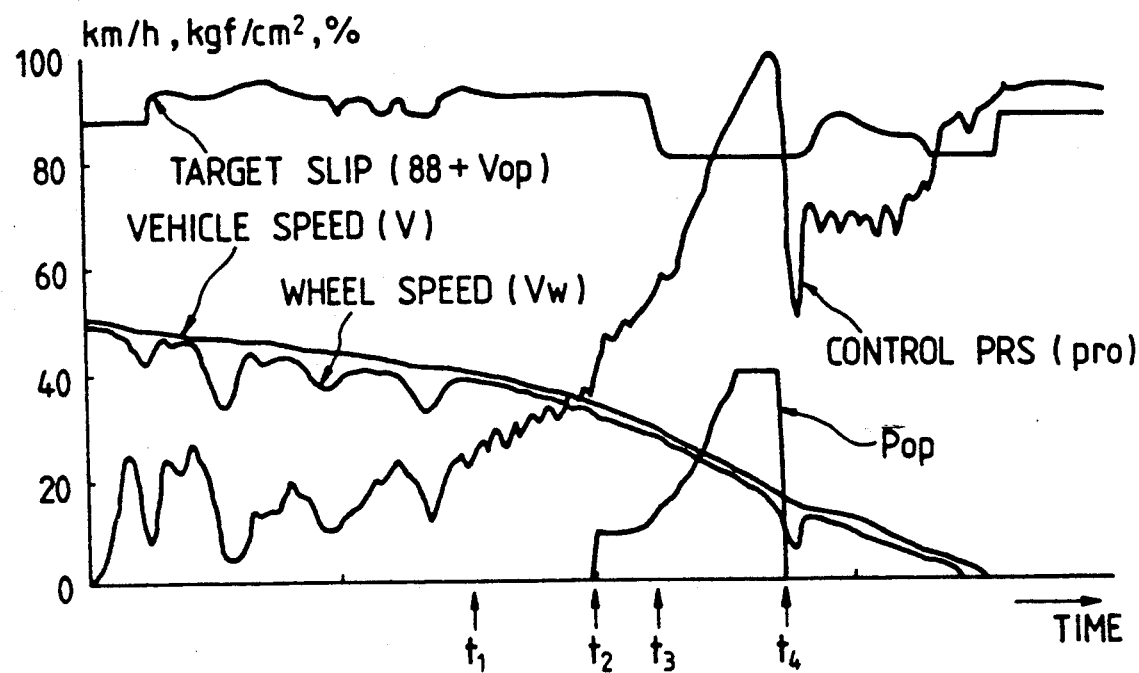
FIG. 10 is a graph showing time-dependent variations in various parameters which occur during the activation of the antiskid control system of FIG. 2.

FIG. 10 shows time-dependent variations in the vehicle speed V, the wheel speed Vw, the target slip ratio, the hydraulic braking pressure "pro", and the corrective hydraulic pressure value Pop under conditions where the vehicle is abruptly braked from a speed of 50 km/h and the vehicle moves from a snow-covered hard road into a wet asphalt road at a moment t1. The target slip ratio equals the fuzzy reasoning corrective value Vop plus 88% of the reference value, and corresponds to the target wheel speed Vw* divided by the vehicle speed V.

Figure 11:
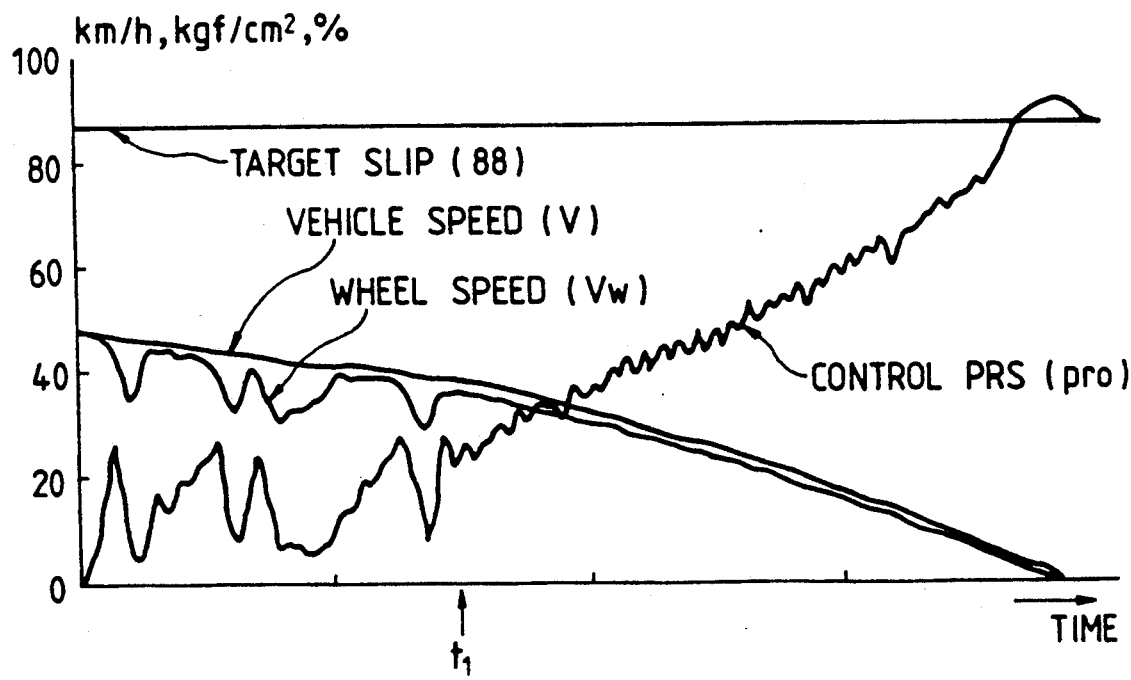
FIG. 11 is a graph being similar to FIG. 10 and showing time-dependent variations in various parameters.

FIG. 11 shows time-dependent variations in the vehicle speed V, the wheel speed Vw, and the hydraulic braking pressure "pro" under vehicle travel conditions similar to those of FIG. 10 except that the target slip ratio is fixed to 88% of the reference value and that the fuzzy reasoning corrective value Vop is held null.

In both of the cases of FIG. 10 and FIG. 11, during an interval until a moment near the point t1, the wheel speed Vw repeatedly rises and drops while the vehicle speed V decreases. At a time near the moment t1, since the frictional force on the road surface increases abruptly, the hydraulic braking pressure "pro" determined for the snow-covered hard road can not lower the wheel speed Vw sufficiently so that the vehicle speed V and the wheel speed Vw are close to each other.

In the case of FIG. 11, during an interval following the moment t1, the hydraulic braking pressure "pro" is increased gradually, and the vehicle speed V and the wheel speed Vw gradually drop to zero.

In the case of FIG. 10, the wheel speed Vw increases above the target wheel speed Vw* at a time near the moment t1 and thus the index Ces increases, so that the corrective hydraulic pressure value Pop occurs and the hydraulic braking pressure "pro" rises abruptly at a moment t2 following the moment t1. While the wheel speed Vw remains higher than the target wheel speed Vw*, the index Ces increases and the corrective hydraulic pressure value Pop continues to increase so that the hydraulic braking pressure "pro" rises. The rise in the hydraulic braking pressure "pro" causes the wheel speed Vw to drop greatly at a moment around a point t4 following the point t2. As a result of the drop in the wheel speed Vw, the wheel speed Vw becomes lower than the target wheel speed Vw* and thus the index Ces decreases to zero. The corrective hydraulic pressure value Pop drops in accordance with the decreases in the index Ces.

In the case of FIG. 10, at a moment t3 between the moments t2 and t4, the target slip ratio is changed to a value smaller than 80% of the reference value. Accordingly, the target wheel speed Vw determined during an interval following the moment t3 is lower than the target wheel speed determined during an interval until the moment t3, so that the integral-added optimal regulator outputs higher target hydraulic pressures P* during an interval following the moment t3. The drop in the corrective hydraulic pressure value Pop and the increase in the target hydraulic pressure P* cause appropriately strong braking forces in correspondence with an increase in the frictional force due to the abrupt change of the road surface conditions. The appropriately strong braking forces allow the vehicle to stop earlier than in the case of FIG. 11.

As described previously, since the target slip ratio which determines the target wheel speed depends on the values of the variables related to the braking, the antiskid control can respond to a change in the conditions of the road surface so that the vehicle can stop early.

Since the corrective value Vop for the target slip ratio is determined through the fuzzy reasoning, an abrupt change of road surface conditions is gathered reliably from the values of the input variables and the experiences.

Since the corrective hydraulic pressure value Pop is added on the basis of the fuzzy reasoning in order to compensate a response lag of the wheel speed feedback control, the antiskid control can quickly respond to the abrupt change of the road surface conditions and thereby it is possible to generate appropriate braking forces which match the changed road surface conditions. The appropriate braking forces allow the vehicle to stop early.

This embodiment may be modified in various manners. For example, the optimal feedback control based on modern control theory may be replaced by classical feedback control. The hydraulic brake arrangement may be replaced by an electromagnetic brake arrangement.

The target wheel speed Vw* may be determined on the basis of the slip ratio at high vehicle speeds and be determined on the basis of the vehicle speed at low vehicle speeds as follows:

At high speeds: $Vw^* = (0.88 + Vop) \cdot V$
At low speeds: $Vw^* = V - (3 - K \cdot Vop)$ In this case, the index Ces is determined as follows:

| At high speeds: | $Cesh = \Sigma(Vw - Vw^*)/V$ | $(Vw > Vw^*)$ |
|---|---|---|
|  | $Cesh = 0$ | $(Vw \leq Vw^*)$ |
| At low speeds: | $Cesl = \Sigma(Vw - Vw^*)$ | $(Vw > Vw^*)$ |
|  | $Cesl = 0$ | $(Vw \leq Vw^*)$ |

The vehicle speed V may be added to the input variables and the rules 5 and 6 may be changed to the following rules 5' and 6' and the following rules 7 and 8 may be added:

---
5'. Cesλ = VB & V = LS then
    Pop = VB
6'. if Cesλ = LB & V = LS then
    Pop = LB
7. if Cesh = VS & V = LB then
    Pop = VB
8. if Cesh = LB & V = LB then
    Pop = LB
---

A difference "dpro" between the hydraulic braking pressures related to the right-hand wheel and the left-hand wheel, and a value "ddpro" of differentiation of this difference may be used as input variables. In this case, the yaw moment of the vehicle body is controlled in accordance with these input variables under braking conditions where the right-hand vehicle wheel and the left-hand vehicle wheel are subjected to different frictional forces from the road surface.

The vehicle may be provided with a yaw rate sensor detecting an angular acceleration of the vehicle, and the detected yaw rate "yawr" and a vehicle steering angle "str" may be used as input variables in determining target speeds of the respective vehicle wheels.

This invention is not limited to the embodiment and the modifications. For example, this invention may be applied to various servo control systems. In the application of this invention to an automotive engine control system, a target torque output of the engine for the control of the engine throttle valve position, the engine spark timing, the engine fuel supply rate, and others is determined in accordance with a speed of depression of an accelerator pedal and a vehicle wheel slip ratio through fuzzy reasoning. In the application of this invention to an automotive four-wheel steering control system, target steering angles of the rear wheels are determined through fuzzy reasoning. In the application of this invention to an automotive air conditioner, a target temperature is determined through fuzzy reasoning.

What is claimed is:

1. A vehicle servo control system for an antiskid brake system comprising:
   (a) detecting means operatively connected to a wheel for detecting a wheel speed of a vehicle;
   (b) calculating means connected to the detecting means for calculating an input variable on the basis of said wheel speed detected by said detecting means:
   (c) fuzzy reasoning means connected to the calculating means for storing predetermined membership functions each of which is a function of said input variable, for determining membership values of said membership functions by using said input variable, and for determining a command value in accordance with said membership values of said membership functions; and
   (d) actuator means operatively connected to the fuzzy reasoning means and being responsive to said fuzzy reasoning means for varying a brake actuation force applied to said vehicle wheel in accordance with said command value.

2. A system according to claim 1 wherein said fuzzy reasoning means determines a target wheel speed in accordance with said membership values of said membership functions.

3. A system according to claim 1 further comprising:
   feedback control means for calculating a brake actuation command which allows said wheel speed detected by said detecting means to follow a target wheel speed; and
   correction means for correcting said brake actuation command calculated by said feedback control means in accordance with said command value determined by said fuzzy reasoning means, and for outputting the corrected brake actuation command to said actuator means.

4. A system according to claim 1 wherein said calculating means calculates a wheel acceleration range on the basis of said wheel speed detected by said detecting means.

5. A vehicle servo control system for an antiskid brake system comprising:
   (a) detecting means operatively connected to a wheel for detecting a wheel speed of a vehicle;
   (b) calculating means connected to the detecting for calculating an input variable on the basis of means said wheel speed detected by said detecting means;
   (c) fuzzy reasoning means connected to the calculating means for storing predetermined membership functions each of which is a function of said input variable, for determining membership values of said membership functions by using said input variable, and for determining a target wheel speed in accordance with said membership values of said membership functions;
   (d) feedback control means for calculating a brake actuation command which allows said wheel speed detected by said detecting means to follow said target wheel speed determined by said fuzzy reasoning means; and
   (e) actuator means for varying a brake actuation force applied to said wheel in accordance with said brake actuation command calculated by said feedback control means.

6. A system according to claim 5 wherein said actuator means comprises:
   hydraulic brake means for varying said brake actuation force in response to a hydraulic pressure; and
   modulator means for modulating said hydraulic pressure in response to said brake actuation command.

7. A vehicle servo control system for an antiskid brake system having hydraulic brake means, the control system comprising:
   (a) detecting means operatively connected to a wheel for detecting a wheel speed of a vehicle;
   (b) pressure detecting means for detecting hydraulic pressure of the hydraulic brake means:
   (c) first calculating means connected to the detecting means for calculating an input variable on the basis of said wheel speed detected by said detecting means;
   (d) second calculating means for calculating other input variables on the basis of said hydraulic pressure detected by said pressure detecting means:
   (e) fuzzy reasoning means connected to the first and second calculating means for storing predetermined membership functions each of which is a function of said input variables calculated by the first and second calculating means, for determining membership values of said membership functions by using said input variables calculated by the first and second calculating means, and for determining a command value in accordance with said membership values of said membership functions; and
   (f) actuator means operatively connected to the fuzzy reasoning means and being responsive to said fuzzy reasoning means for varying a brake actuation force applied to said vehicle wheel in accordance with said command value.

8. A system according to claim 7 wherein said actuator means comprises:
   hydraulic brake means for varying said brake actuation force in response to a hydraulic pressure; and
   modulator means for modulating said hydraulic pressure in response to said brake actuation command.

9. A system according to claim 8 wherein said fuzzy reasoning means determines a target wheel speed and a corrective hydraulic pressure in accordance with said input variables.

10. A system according to claim 9 further comprising:
    feedback control means for calculating a target hydraulic pressure which allows said wheel speed detected by said detecting means to follow said target wheel speed; and correction means for correcting said target hydraulic pressure calculated by said feedback control means in accordance with said corrective hydraulic pressure determined by said fuzzy reasoning means, and for outputting the corrected target hydraulic pressure as the command value.

11. A vehicle wheel speed servo control system comprising:
(a) actuator means operatively connected to a vehicle wheel for regulating a rotational speed of the vehicle wheel;
(b) a wheel speed sensor operatively connected to the vehicle wheel for generating a rotational speed signal of the vehicle wheel; and
(c) electronic control means connected to the wheel speed sensor for receiving the rotational speed signal, and connected to the actuator means for outputting a control signal;
wherein said electronic control means including:
(c1) wheel speed calculating means for calculating a vehicle wheel speed on the basis of the rotational speed signal;
(c2) wheel acceleration calculating means for calculating a vehicle wheel acceleration on the basis of the vehicle wheel speed;
(c3) range calculating means connected to the wheel acceleration calculating means for determining a range of the wheel acceleration on the basis of a maximal value and a minimal value of the wheel acceleration;
(c4) fuzzy reasoning means responsive to the range calculating means for storing membership functions each of which is a function of the wheel acceleration range as an input variable, for storing rules each of which represents a relationship in the membership function of the wheel acceleration range and the target wheel speed as an output variable, for determining the target wheel speed on the basis of the membership functions, the rules and the wheel acceleration range, and for outputting the target wheel speed; and
(c5) means connected to the fuzzy reasoning means for generating a control signal which allows the vehicle wheel speed to follow the target wheel speed.

12. The system of claim 11 wherein the fuzzy reasoning means is operative to calculate degrees of satisfaction of the respective rules, wherein the respective rules include condition parts related to the input variables and conclusion parts related to the output variable, wherein the fuzzy reasoning means is operative to calculate a weighted average of the conclusion parts of the rules with weights equal to the calculated degrees of satisfaction of the respective rules, and wherein the fuzzy reasoning means is operative to set the output variable to the weighted average.

13. A vehicle wheel speed servo control system comprising:
(a) hydraulic brake means for regulating a hydraulic pressure to brake rotation of a vehicle wheel;
(b) a pressure sensor detecting a pressure of the hydraulic brake means;
(c) a wheel speed sensor operatively connected to the vehicle wheel for detecting a rotational speed of the vehicle wheel;
(d) target wheel speed calculating means responsive to the wheel speed sensor for determining a target wheel speed in accordance with the detected wheel speed and a target slip ratio;
(e) index calculating means responsive to the wheel speed sensor and the target wheel speed calculating means for calculating a difference between the target wheel speed and the detected wheel speed, and for defining the calculated difference as an index representative of an insufficiency of the hydraulic pressure;
(f) fuzzy reasoning means responsive to the index calculating means for storing membership functions each of which is a function of the index as an input variable, for storing rules each of which represents a relationship in the membership function of the index and the target pressure as an output variable, for determining the target pressure on the basis of the membership functions, the rules and the index, and for outputting the target pressure; and
(g) control means responsive to the fuzzy reasoning means and the pressure sensor for generating a control signal and for outputting the control signal to the hydraulic brake means to allow the detected pressure to follow the target pressure.

14. The system of claim 13 wherein the fuzzy reasoning means is operative to calculate degrees of satisfaction of the respective rules, wherein the respective rules include condition parts related to the input variables and conclusion parts related to the output variable, wherein the fuzzy reasoning means is operative to calculate a weighted average of the conclusion parts of the rules with weights equal to the calculated degrees of satisfaction of the respective rules, and wherein the fuzzy reasoning means is operative to set the output variable to the weighted average.

15. A servo control system for controlling a behavior vehicle by use of a controlling system, the control system comprising:
(a) an actuator connected to the controlling system of the vehicle, the actuator operating in accordance system with an electric signal, wherein a controlled quantity of the vehicle is adjusted by operation of the actuator;
(b) detecting means, connected to the controlling system of the vehicle, for detecting the controlled quantity adjusted by the actuator and for generating a detection signal representing the detected controlled quantity; and
(c) an electronic control means connected to the detecting means and receiving the detection signal, the electronic control means being further connected to the actuator and generating a control signal which operates the actuator;
wherein the electronic control means comprises:
means for determining a plurality of input variable values on the basis of the detection signal;
fuzzy reasoning means prestoring a plurality of membership functions complying with a plurality of predetermined rules as functions of the respective input variables, the fuzzy reasoning means determining a plurality of membership values from the input variable values on the basis of the membership functions, the fuzzy reasoning means determining a target value from the membership values; and
means for outputting the control signal to the actuator on the basis of the target value.

16. The system of claim 15 wherein the actuator comprises a brake unit controlling a braking force acting on a vehicle.

17. The system of claim 16 wherein the target value comprises a target speed of a wheel of the vehicle during braking of the vehicle.

18. The system of claim 17 wherein the input variable comprises an index dependent on a difference between a rotational speed of the vehicle wheel and the target vehicle wheel speed.

19. The system of claim 16 wherein the target value comprises a target hydraulic braking pressure during braking of the vehicle.

20. The system of claim 16 wherein the input variable comprises a road surface condition variable relating to a friction coefficient of a road surface.

21. The system of claim 20 wherein the road surface condition variable comprises an acceleration of the vehicle.

22. The system of claim 20 wherein the road surface condition variable comprises an amplitude of a variation in an acceleration of a wheel of the vehicle.

23. The system of claim 15 wherein the detecting means is operative to detect a rotational speed of a wheel of a vehicle, and the actuator controlling a braking force acting on the vehicle wheel.

24. The system of claim 23 wherein the input variable comprises an insufficiency variable representative of an insufficiency of the braking force related to a lag of the braking force, and the fuzzy reasoning correcting means is operative to correct the target value in accordance with the insufficiency variable.

25. The system of claim 15 wherein the fuzzy reasoning correcting means determines a corrective value with respect to a reference value of the target value.

26. A vehicle wheel speed servo control system for controlling a speed of a vehicle wheel, comprising:
(a) wheel speed regulating means operatively connected to the vehicle wheel for regulating a rotational speed of the vehicle wheel;
(b) a wheel speed sensor operatively connected to the vehicle wheel and detecting the rotational speed of the vehicle wheel: and
(c) electronic control means connected to the wheel speed control means and the wheel speed sensor for outputting a control signal to the wheel speed control means;
wherein the electronic control means comprises:
(c1) wheel acceleration calculating means operatively connected to the vehicle wheel for determining an angular acceleration of the vehicle wheel;
(c2) range calculating means operatively connected to the wheel acceleration calculating means for determining a range of the wheel acceleration on the basis of a maximal value and a minimal value of the wheel acceleration;
(c3) rule means operatively connected to the wheel acceleration calculating means and the range calculating means for holding membership functions which determine an output variable on the basis of a plurality of rules using the wheel acceleration and the wheel acceleration range as input variables and using a target rotational speed as an output variable, and for outputting the output variable;
(c4) means operatively connected to the rule means for inferring the target rotational speed from the output variable outputted from the rule means; and (c5) means operatively connected to the means (c4) for generating the control signal to allow the detected wheel speed to follow the target rotational speed and for outputting the control signal to the actuator.

27. The system of claim 26 wherein the rule means is operative to calculate degrees of satisfaction of the respective rules, wherein the respective rules include condition parts related to the input variables and conclusion parts related to the output variable, wherein the rule means is operative to calculate a weighted average of the conclusion parts of the rules with weights equal to the calculated degrees of satisfaction of the respective rules, and wherein the rule means is operative to set the output variable to the weighted average.

28. A vehicle wheel speed servo control system comprising:
(a) hydraulic brake means operatively connected to a vehicle wheel for braking rotation of the vehicle wheel;
(b) a pressure sensor operatively connected to the hydraulic brake means and detecting a pressure of the hydraulic brake means; and
(c) electronic control means for generating a control signal and for outputting the control signal to the hydraulic brake means;
wherein the electronic control means comprises:
(c1) a wheel speed sensor operatively connected to the vehicle wheel and detecting a rotational speed of to the vehicle wheel;
(c2) target wheel speed calculating means operatively connected to the wheel speed sensor for determining a target wheel speed with respect to the detected wheel speed in accordance with a target slip ratio;
(c3) index calculating means operatively connected to the means (c1) and the means (c2) for calculating a difference between the target wheel speed and the detected wheel speed, and for defining the calculating difference as an index representative of an insufficiency of the hydraulic pressure;
(c4) rule means for holding membership functions which determine an output variable on the basis of a plurality of rules using the index as an input variable and using a target hydraulic pressure variable as an output variable, the target hydraulic pressure variable relating to a target hydraulic pressure:
(c5) means operatively connected to the rule means for inferring the target hydraulic pressure from the output variable outputted from the rule means: and
(c6) means operatively connected to the means (c5) for generating the control signal to allow the detected pressure to follow the target pressure and for outputting the control signal to the hydraulic brake means.

29. The system of claim 28 wherein the rule means is operative to calculate degrees of satisfaction of the respective rules, wherein the respective rules include condition parts related to the input variable and conclusion parts related to the output variable, wherein the rule means is operative to calculate a weighted average of the conclusion parts of the rules with weights equal to the calculated degrees of satisfaction of the respective rules, and wherein the rule means is operative to set the output variable to the weighted average.

30. A vehicle wheel speed control system comprising:
(a) means for detecting a condition which affects an actual rotational speed of a vehicle wheel, and for generating and outputting a detected condition signal representative of the detected condition;

(b) means for detecting the actual wheel speed, and for generating and outputting an actual speed signal representative of the detected actual wheel speed;

(c) wheel speed regulating means operatively connected to the vehicle wheel for regulating a rotational speed of the vehicle wheel; and (d) electronic control means connected to the means (a), (b), (c);

wherein the electronic control means comprises:

(d1) means for holding rules representative of respective predetermined relationships between the condition and primary target wheel speeds, and for generating and outputting a rule signal representative of the held rules;

(d2) means connected to the condition detecting means and the rule holding means and receiving the detected condition signal and the rule signal from the condition detecting means and the rule holding means for using the rules and thereby determining the respective primary target wheel speeds in accordance with the detected condition, and for generating and outputting a primary target signal representative of the determined respective primary target wheel speeds;

(d3) means connected to the condition detecting means and the rule holding means and receiving the detected condition signal and the rule signal from the condition detecting means and the rule holding means for calculating degrees of satisfaction of the respective rules with respect to the detected condition, and for generating and outputting a satisfaction signal representative of the calculated degrees of satisfaction;

(d4) means connected to the rule using means and the satisfaction degree calculating means and receiving the primary target signal and the satisfaction signal from the rule using means and the satisfaction degree calculating means for determining a secondary target wheel speed in accordance with the primary target wheel speeds and the calculated degrees of satisfaction of the rules, and for generating and outputting a secondary target signal representative of the determined secondary target wheel speed; and (d5) means, responsive to the detected actual wheel speed and the secondary target wheel speed, for generating a control signal to adjust the actual wheel speed wheel speed toward the target wheel speed through feedback control and for outputting the control signal to the wheel speed regulating means.

31. The system of claim 30 wherein the secondary target determining means comprises means for calculating a weighted average of the primary target wheel speeds with weights equal to the respective degrees of satisfaction of the rules, and means for determining the secondary target wheel speed in accordance with the weighted average.

32. A servo control system for an antiskid brake system, comprising:

(a) detecting means operatively connected to a vehicle wheel for detecting a wheel speed of the vehicle;

(b) calculating means connected to said detecting means for calculating an input variable on the basis of said wheel speed detected by said detecting means;

(c) fuzzy reasoning means operatively connected to said calculating means for storing predetermined membership functions each of which is a function of said input variable, for storing rules each of which represents a relationship in said membership function and a target wheel speed as an output variable, for determining said target wheel speed in accordance with said membership functions, said rules and said input variable, and for outputting said target wheel speed;

(d) optimal feedback control means operatively connected to said detecting means for receiving said wheel speed detected by said detecting means, and operatively connected to said fuzzy reasoning means for receiving said target wheel speed determined by said fuzzy reasoning means, the optimal feedback control means being for storing a predetermined optimal feedback gain which allows said wheel speed to follow said target wheel speed, and for calculating a brake actuation command by use of a vector calculation between said wheel speed, said target wheel speed, and said optimal feedback gain; and (e) actuator means operatively connected to said optimal feedback control means for varying a brake actuation force applied to said vehicle wheel in accordance with said brake actuation command.

* * * * *